(12) United States Patent
Tymchuk et al.

(10) Patent No.: US 10,889,509 B2
(45) Date of Patent: Jan. 12, 2021

(54) ULTRAVIOLET LIGHT WATER TREATMENT UNIT FOR HIGH FLOW RATE SYSTEMS

(71) Applicants: EBBTIDES MEDICAL INC., Surrey (CA); DOMINION INVESTMENTS LLC, Salt Lake City, UT (US)

(72) Inventors: Steven Tymchuk, Surrey (CA); Richard Olsen, Salt Lake City, UT (US); Steve Hansen, Round Rock, TX (US)

(73) Assignees: EBBTIDES MEDICAL INC (CA); DOMINION INVESTMENTS LLC (CA)

( * ) Notice: Subject to any disclaimer, the term of this patent is extended or adjusted under 35 U.S.C. 154(b) by 94 days.

(21) Appl. No.: 16/004,042

(22) Filed: Jun. 8, 2018

(65) Prior Publication Data
US 2018/0354814 A1  Dec. 13, 2018

(30) Foreign Application Priority Data
Jun. 9, 2017  (CA) ..................... 2970494

(51) Int. Cl.
*C02F 1/32* (2006.01)
*C02F 103/00* (2006.01)
*C02F 103/02* (2006.01)

(52) U.S. Cl.
CPC ........ *C02F 1/325* (2013.01); *C02F 2103/003* (2013.01); *C02F 2103/023* (2013.01); *C02F 2103/026* (2013.01); *C02F 2201/326* (2013.01); *C02F 2201/3222* (2013.01); *C02F 2201/3223* (2013.01); *C02F 2201/3228* (2013.01); *C02F 2209/006* (2013.01); *C02F 2209/008* (2013.01);
(Continued)

(58) Field of Classification Search
CPC ............... C02F 1/325; C02F 2103/003; C02F 2103/023; C02F 2103/026; C02F 2103/04; C02F 9/005; C02F 2201/3222; C02F 2201/3223; C02F 2201/3228; C02F 2201/326; C02F 2201/3225; C02F 2209/006; C02F 2209/008; C02F 2209/03; C02F 2301/04; C02F 2301/046; A61L 2/0047; A61L 2/10; A61L 2202/11; A61L 2202/16
See application file for complete search history.

(56) References Cited

U.S. PATENT DOCUMENTS 4,615,799 A * 10/1986 Mortensen .............. C02F 1/325
                                                          210/177
4,621,195 A    11/1986 Larsson
(Continued)

OTHER PUBLICATIONS

Extended European Search Report, Application No. EP 18 17 7136, dated Jul. 26, 2018, 11 pages.
(Continued)

*Primary Examiner* — Lessanework Seifu
(74) *Attorney, Agent, or Firm* — Baumgartner Patent Law

(57) ABSTRACT

A fluid disinfection device is provided for integration into a high flow rate, controlled pressure, closed recirculation system, the device for disinfecting medical devices and lines in the system using high intensity UV-C light. A method of disinfecting a high flow rate, controlled pressure, closed recirculation system that includes a medical device is also provided.

21 Claims, 8 Drawing Sheets

(52) U.S. Cl.
CPC .... *C02F 2209/03* (2013.01); *C02F 2301/046* (2013.01); *C02F 2303/04* (2013.01)

(56) References Cited

U.S. PATENT DOCUMENTS

| | | | | |
|---|---|---|---|---|
| 5,290,439 | A | * | 3/1994 | Buchwald .................. A61L 2/10 210/198.1 |
| 5,843,309 | A | | 12/1998 | Mancil |
| 6,909,101 | B2 | | 6/2005 | Nishioka |
| 7,175,760 | B2 | | 2/2007 | Cary |
| 8,747,764 | B1 | | 6/2014 | Burchman |
| 2007/0045197 | A1 | * | 3/2007 | Ogut ....................... C02F 1/325 210/748.11 |
| 2008/0131330 | A1 | * | 6/2008 | Lyon ......................... A61L 2/10 422/105 |
| 2008/0169249 | A1 | * | 7/2008 | Ter Stege ................. A47G 7/06 210/748.11 |
| 2011/0215037 | A1 | | 9/2011 | Cassassuce |
| 2013/0126430 | A1 | * | 5/2013 | Kenley ................... B01D 61/00 210/638 |
| 2013/0146783 | A1 | | 6/2013 | Boodaghians |
| 2016/0213444 | A1 | | 7/2016 | Kiremitci |

OTHER PUBLICATIONS

Canadian Intellectual Property Office Office Action, Application No. 3008418, dated Mar. 13, 2019, 6 pages.

\* cited by examiner

ULTRAVIOLET LIGHT WATER TREATMENT UNIT FOR HIGH FLOW RATE SYSTEMS

CROSS-REFERENCE TO RELATED APPLICATIONS

The application claims benefit of priority to Canadian Patent Application No. 2,970,484, filed Jun. 9, 2017, which is hereby incorporated in its entirety including all tables, figures, and claims.

FIELD

The present technology relates to a system and method for treating water in heater-cooler units (HCUs) and other high flow rate devices to reduce mycobacterial and other microorganism contamination in the water and the heater-cooler unit and high flow rate devices. More specifically, the technology reduces or eliminates *Mycobacterium chimaera* (*M. chimaera*) contamination in water circulated through the heater-cooler unit and reduces or eliminates biofilm of *M. chimaera* in the heater-cooler unit or other closed system fluid circulators.

BACKGROUND

*Mycobacterium chimaera* is an emerging pathogen causing disastrous infections of heart valve prostheses, vascular grafts, and disseminated infections after open-heart surgery. It was first recognized in 2012 in Switzerland. Growing evidence supports airborne transmission resulting from aerosolization of *M. chimaera* from contaminated water tanks of heater-cooler units (HCUs) that are used with extracorporeal circulation during surgery.

Current approaches to disinfecting HCUs include: adding 200 mL of 3% sodium hypochlorite to the HCU water tanks filled with filtered tap water to a final concentration 0.045% sodium hypochlorite in the water tank and circuits every three months, changing the water, which includes hydrogen peroxide to a final concentration ≈0.02% hydrogen peroxide in water tank and circuits, every 14 days, adding an additional 50 mL of 3% hydrogen peroxide every 5 days; and retrofitting the HCU with an ultraviolet (UV) emitting light.

HCU are used in open heart surgery to provide a controlled, consistent flow rate of water at a controlled and consistent temperature to the heart. In cardiac surgical units, the HCU function to cool the heart so that it rests, and, on a separate circuit, to oxygenate the heart.

With regard to UV disinfecting systems United States Patent Application 20130146783 discloses on-aircraft potable water disinfection with UV LED light sources that are positioned in-line with the water delivery system. Further embodiments relate to using the scavenged heat generated by the LEDs to deliver heat back to the water supply tube for temperature stabilization and to prevent water freezing. LED light sources have not been shown to invariably remove microbial contamination.

United States Patent Application 20110215037 discloses a compact point of use water purifier intended for both urban and rural areas of developing countries, consisting of a spigot with integrated UV radiation source adjacent to an outlet orifice to selectively on demand expose untreated water when the spigot valve mechanism is activated to dispense water for consumption. The water purifier is connectable to an electric power source, either 110V/220V AC or 12 VDC, by means of a transformer unit delivering the appropriate voltage to spigot unit. This unit would not be suitable for use in a medical setting. There is no control of flow rate.

U.S. Pat. No. 6,909,101 discloses a water purifying apparatus with a comparatively simple configuration that can be used easily. First, a usage state is adopted by operating the knob of the faucet. In doing so, the detection means detects the flow of the water. As a result, the control unit supplies electricity to the ultraviolet light generator based on the detection signal form the detection means, and ultraviolet light is emitted. The emitted ultraviolet light then irradiates water within the passage. Water sterilization can then be carried out as a result of doing this. The ultraviolet light generator only generates light when the faucet is in use. It is therefore possible to utilize the ultraviolet light generator for long periods of time and savings are made with respect to power consumption. Further, a curving part is formed in the passage, and the ultraviolet light generator is arranged in the vicinity of the curving part. The time for which the water is irradiated with ultraviolet rays from the ultraviolet light generator is therefore made long, and the water purification efficiency is improved. As there is no control of flow rate, the system would not invariably remove microbial contamination.

U.S. Pat. No. 5,843,309 discloses a water purification system utilizes a radial filter and an ultraviolet lamp in a small, portable, countertop housing. A standpipe is positioned between the filter and the ultraviolet lamp to control the flow of water so that it flows along substantially the entire length of the UV lamp. The lamp is made integral with a quartz-tube covering and a threaded cap and connector to enable replacement of the UV lamp assembly. The housing encompassing the filter system is also easily disassembled to enable cleaning of the housing and replacement of the filter. A pressure vent is provided in the housing cover to equalize pressure and provide for a water level differential when the filter is disabled. A UV lamp indicator is included to show that the lamp is in operation. The water to be purified is not under pressure as it simply drains into and out of the device. The flow rate through the purification system is also not controlled. It is an open system and is gravity fed. The irradiation of the UV light source is 27 millijoules per square centimetre at one centimeter to provide a dosage within the 30 millijoules a second per square centimeter recommended by the industry providing clean water solutions for potable water.

What is needed is a device and system that safely reduces, controls or ameliorates *Mycobacterium chimaera* contamination in water circulated by HCUs and other high flow rate, controlled pressure devices to an acceptable level and to reduce, control or ameliorate *Mycobacterium chimaera* biofilm in the HCU and lines. The device preferably would not impact on the temperature nor the flow rate of the water. The device would preferably be a stand-alone device that could be approved for use as a medical device, and which would not require any retro-fitting of existing HCUs or other high flow rate, controlled pressure devices. The device should necessarily allow for a very high flow rate and hence a very low exposure time of the fluid to the UV light source. The device should also be effective enough to reduce or eliminate the need for the manual disinfection procedures that have intensified and that disrupt operations and schedules.

SUMMARY

The present technology provides a device and system that safely reduces, controls or ameliorates *Mycobacterium chi-*

*maera* contamination in water circulated by HCUs and other high flow rate, controlled pressure devices to an acceptable level and to reduce, control or ameliorate *Mycobacterium chimaera* biofilm in the HCU and lines. The device does not impact on the temperature nor the flow rate of the water. The device is a stand-alone device that can be approved for use as a medical device, and which would not require any retro-fitting of existing HCUs or other high flow rate, controlled pressure devices. The device allows for a very high flow rate and hence a very low exposure time of the fluid to the UV light source. The device is effective enough to reduce or eliminate the need for the manual disinfection procedures that have intensified and that disrupt operations and schedules.

In one embodiment, a fluid disinfection device is provided for integration into a high flow rate, controlled pressure, closed recirculation system, the device for disinfecting medical devices and lines in the system, the device comprising at least one unit, a unit including: at least one cylinder, the cylinder defining a bore, the bore terminating in a first end and a second end, the cylinder including an electropolished, mirrored inner surface, an inlet in a vicinity of the first end and an outlet in a vicinity of the second end, both the inlet and the outlet in fluid communication with the bore, a quartz tube centrally located in the bore and extending between the first end and the second end, the bore and quartz tube defining a void volume, a high irradiance Ultraviolet-C (UV-C) light source housed in the quartz tube and extending a length of the quartz tube, the light source including a power connector; an inlet line and an outlet line, the lines in fluid communication with the inlet and outlet, respectively; a first end cap and a second end cap, the end caps releasably sealing the first end and the second end, one of the first end cap and the second end cap including an orifice for the power connector to extend therefrom; a ballast for the UV-C light source, the ballast in electrical communication with the power connector; a power cord in electrical communication with the ballast; and a ballast control panel in electrical communication with the ballast, the ballast controller including a relay; a housing for the unit; an external inlet line connector; and an external outlet line connector, the connectors in fluid communication with the inlet line and outlet line, respectively and for fluid communication with an external inlet line and an external outlet line respectively, from a medical device.

In the device, the cylinder and the inlet and outlet lines may be insulated.

The device may comprise two units.

The device may comprise three units.

The device may comprise a UV sensor, the UV sensor in electrical communication with the relay.

The device may comprise a flow switch, the flow switch in electrical communication with the relay.

In the device, the ballast controller may include an interface, the interface located at an outer surface of the housing.

The device may comprise a temperature switch, the temperature switch in electrical communication with the relay.

In the device, the ballast controller may include a timer.

The device may further comprise a processor, firmware, the firmware for instructing the processor, and a wireless antenna, the wireless antenna in electronic communication with the processor, the wireless antenna for communicating with a wireless antenna on the medical device.

In the device, the firmware may be configured to instruct the processor to communicate a ready signal to the medical device at a predetermined time after the UV-C light source is turned on.

In another embodiment, a high flow rate, controlled pressure, closed recirculation system is provided, the system including a medical device, the medical device including firmware, a processor and a wireless antenna, an external inlet line in fluid communication with the medical device, an external outlet line in fluid communication with the medical device, a disinfection device for reducing or eliminating microbes, the disinfection device comprising at least one unit, a unit including: at least one cylinder, the cylinder defining a bore, the bore terminating in a first end and a second end, the cylinder including a mirrored inner surface, an inlet in a vicinity of the first end and an outlet in a vicinity of the second end, both the inlet and the outlet in fluid communication with the bore, a quartz tube centrally located in the bore and extending between the first end and the second end, the bore and quartz tube defining a void volume, a high irradiance Ultraviolet-C (UV-C) light source housed in the quartz tube and extending a length of the quartz tube, the light source including a power connector; an inlet line and an outlet line, the lines in fluid communication with the inlet and outlet, respectively; a first end cap and a second end cap, the end caps releasably sealing the first end and the second end, one of the first end cap and the second end cap including an orifice for the power connector to extend therefrom; a ballast for the UV-C light source, the ballast in electrical communication with the power connector; a power cord in electrical communication with the ballast; and a ballast control panel in electrical communication with the ballast, a housing for the unit, an external inlet line connector and an external outlet line connector, the connectors in fluid communication with the inlet line and outlet line, and in fluid communication with the external inlet line and the external outlet line respectively, and a pump, the pump in fluid communication with any one of the inlet line, the outlet line, the external inlet line or the external outlet line.

In the system, the medical device may be a heater-cooler unit.

In the system, there may be two units in the disinfection device.

In the system, the ballast controller may include an interface, the interface located at an outer surface of the housing.

In the system, the ballast controller may include a timer.

In the system, the device may further comprise a processor, firmware, the firmware for instructing the processor, and a wireless antenna, the wireless antenna in electronic communication with the processor, the wireless antenna for communicating with the wireless antenna on the medical device.

In the system, the firmware of the disinfection device may be configured to instruct the processor to communicate a ready signal to the wireless antenna of the medical device at a predetermined time after the UV light source is turned on.

In another embodiment, a method of reducing or eliminating microbial contamination in a high flow rate, controlled pressure, closed recirculation system is provided, the system including a medical device, the method comprising integrating the device described above into the system, turning the UV-C light source on, charging the system with fluid, irradiating the fluid with the high irradiance UV-C light source and recirculating the fluid at a flow rate of at least about 9 liters per minute through the system, thereby reducing or eliminating microbial contamination.

In the method, the flow rate may be about 20 liters per minute.

In the method, the irradiating may provide a dosage of about 100 millijoules per square centimeter.

In the method, the microbial contamination may include microbial cells and biofilm.

In the method, the microbial contamination may include *Mycobacterium chimaera*.

In yet another embodiment, a method of reducing or eliminating microbial contamination a high flow rate, controlled pressure, closed recirculation system is provided, the system including a medical device, the method comprising integrating the device described above and including the firmware, processor and wireless antenna, into the system, turning the UV-C light source on, the UV-C light source warming up for a predefined and programmed time, the fluid disinfection device wirelessly signaling a ready signal to the medical device, charging the system with fluid, irradiating the fluid with the high irradiance UV-C light source and recirculating the fluid at a flow rate of at least about 9 liters per minute through the system, thereby reducing or eliminating microbial contamination.

In the method, the microbial contamination may include microbial cells and biofilm.

In the method, the microbial contamination may include *Mycobacterium chimaera*.

In the method, the flow rate may be about 20 liters per minute.

In the method, the irradiating may provide a dosage of about 120 millijoules per square centimeter.

In the device described above, the high irradiance UV-C light source may irradiate at about 80 milliwatts/square cm at 1 cm.

In the system described above, the high irradiance UV-C light source may irradiate at about 80 milliwatts per square centimeter at 1 cm.

In yet another embodiment, a high flow rate, controlled pressure, closed loop, recirculating fluid disinfection device is provided, the device comprising at least one unit, a unit including: at least one cylinder, the cylinder defining a bore, the bore terminating in a first end and a second end, the cylinder including a mirrored inner surface, an inlet in a vicinity of the first end and an outlet in a vicinity of the second end, both the inlet and the outlet in fluid communication with the bore, a quartz tube centrally located in the bore and extending between the first end and the second end, the bore and quartz tube defining a void volume, a high irradiance Ultraviolet-C (UV-C) light source housed in the quartz tube and extending a length of the quartz tube, the light source including a power connector; a line, the line in fluid communication with the inlet and outlet and including or in fluid communication with a flow-controlled exit port; a pump, which is in fluid communication with the line; a first end cap and a second end cap, the end caps releasably sealing the first end and the second end, one of the first end cap and the second end cap including an orifice for the power connector to extend therefrom; a ballast for the UV-C light source, the ballast in electrical communication with the power connector; a power cord in electrical communication with the ballast; and a ballast control panel in electrical communication with the ballast, a housing for the unit.

DESCRIPTION

Figure 1:
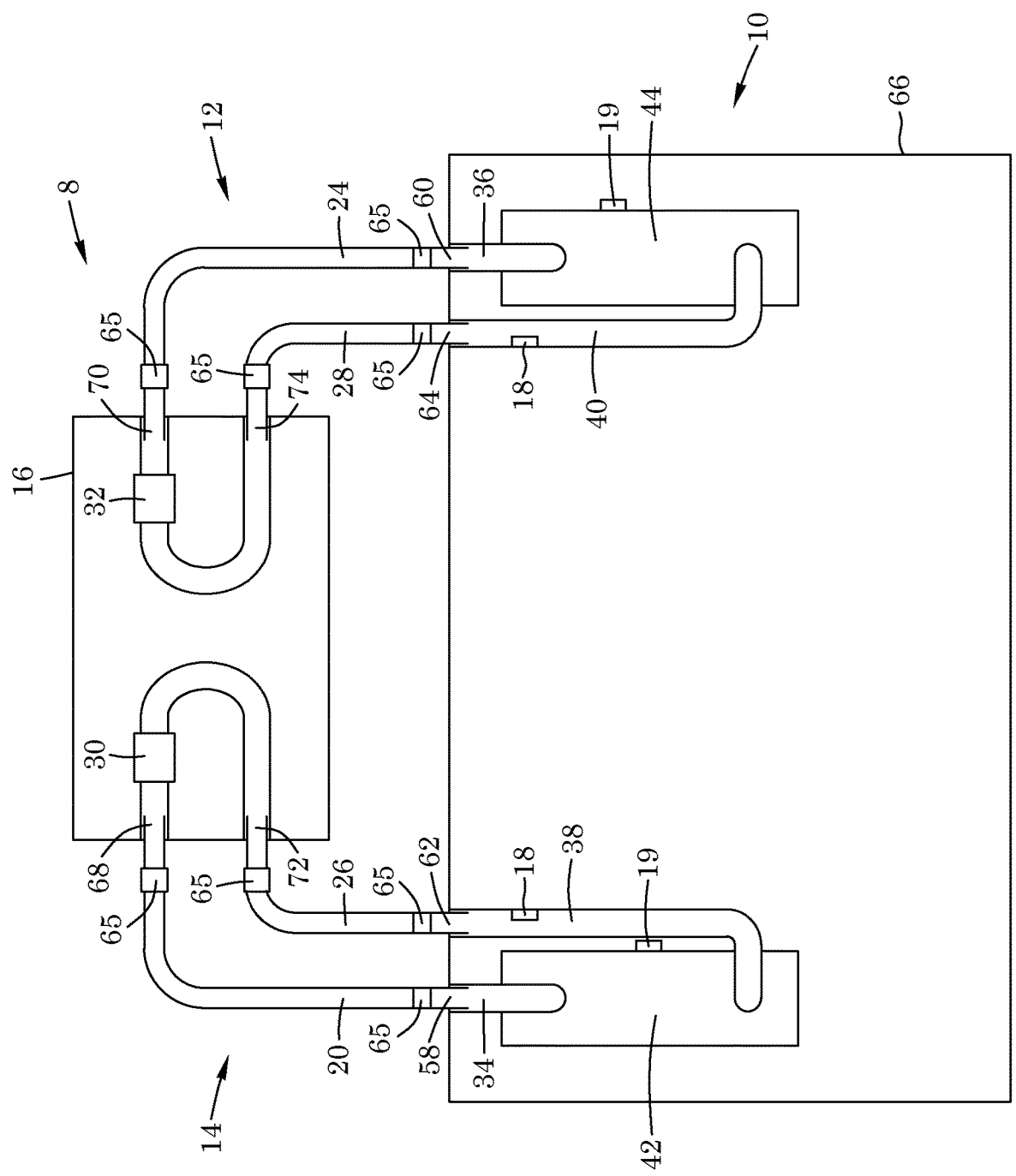
FIG. 1 is a schematic of the system of the present technology.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open ended terms (i.e., meaning "including, but not limited to,") unless otherwise noted.

To the extent necessary to provide descriptive support, the subject matter and/or text of the appended claims is incorporated herein by reference in their entirety.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

BHI agar—in the context of the present technology, BHI agar is Brain heart infusion agar.

CFU—in the context of the present technology, CFU is colony forming units.

R/O—In the context of the present technology, R/O is Reverse osmosis

High flow rate—in the context of the present technology a high flow rate is a flow rate of at least about 15 Litres per minute.

Controlled pressure—in the context of the present technology, a controlled pressure is one that is not gravity fed and is under the control of a pump or other pressurizing device.

High irradiance—in the context of the present technology, high irradiance is about 80 milliwatts per square centimeter to about 120 milliwatts per square centimeter, based on an end of lamp light rating of 80% or 100 milliwatts per square centimeter to about 150 milliwatts per square centimeter based on a new lamp light rating of 100%.

High dosage—in the context of the present technology, high dosage is about 200 millijoules per square centimeter to about 400 millijoules per square centimeter to about 4000 millijoules per square centimeter.

Electropolished—in the context of the present invention, electropolished refers to a surface that has been treated to remove contamination that could cause corrosion. It also creates a smoother finish that is possible by mechanical polishing alone. An electropolished surface has higher reflectivity than does a mechanically polished surface. An electropolished surface lacks directional scars that are present on a surface that has been polished abrasively.

DETAILED DESCRIPTION

As shown in FIG. 1, a system, generally referred to as 8, is for providing a controlled flow of fluid to heart during surgery. The system 8 includes a disinfection device, generally referred to as 10, a first fluid circuit 12 and a second fluid circuit 14 that are coupled to and in fluid communication with the disinfection device 10 and a medical device 16, which in the preferred embodiment is an HCU. It is a closed system, with a high flow rate and controlled pressure. Each fluid circuit 12, 14 has a flow switch 18, a temperature switch 19, an inlet line 20, 24 and an outlet line 26, 28 and is in fluid communication with a circulating fluid source, which may be a pump 30, 32, which may be integral to the medical device 16 or may be a separate unit. The disinfection device 10 includes a device first inlet line 34, a device second inlet line 36, a device first outlet line 38 and a device second outlet line 40, a first cylinder 42 and a second cylinder 44, the first cylinder 42 in fluid communication with the first fluid circuit 12 via the device first inlet line 34 and the device first outlet line 38 and the second cylinder 44 in fluid communication with the second fluid circuit 14 via the device second inlet line 36 and the device second outlet line 40. The cylinders 42, 44 are stainless steel.

The inlet lines 20, 24 and the outlet lines 26, 28 are mated with a first and second inlet 58, 60 and a first and second outlet 62, 64 respectively, with half-inch Hansen couplings (fittings) 65. The first and second inlets and outlets 58, 60, 62, 64 are located on the device housing 66. Similarly, the inlet lines 20, 24 and the outlet lines 26, 28 are mated with at an HCU first inlet 68, 70 and an HCU first and second outlet 72, 74, respectively with half-inch Hansen couplings 65. Note that the Hansen couplings can be replaced in other embodiments with other quick release fittings suitable for surgical settings and approved for use in surgical settings.

Figure 2A:
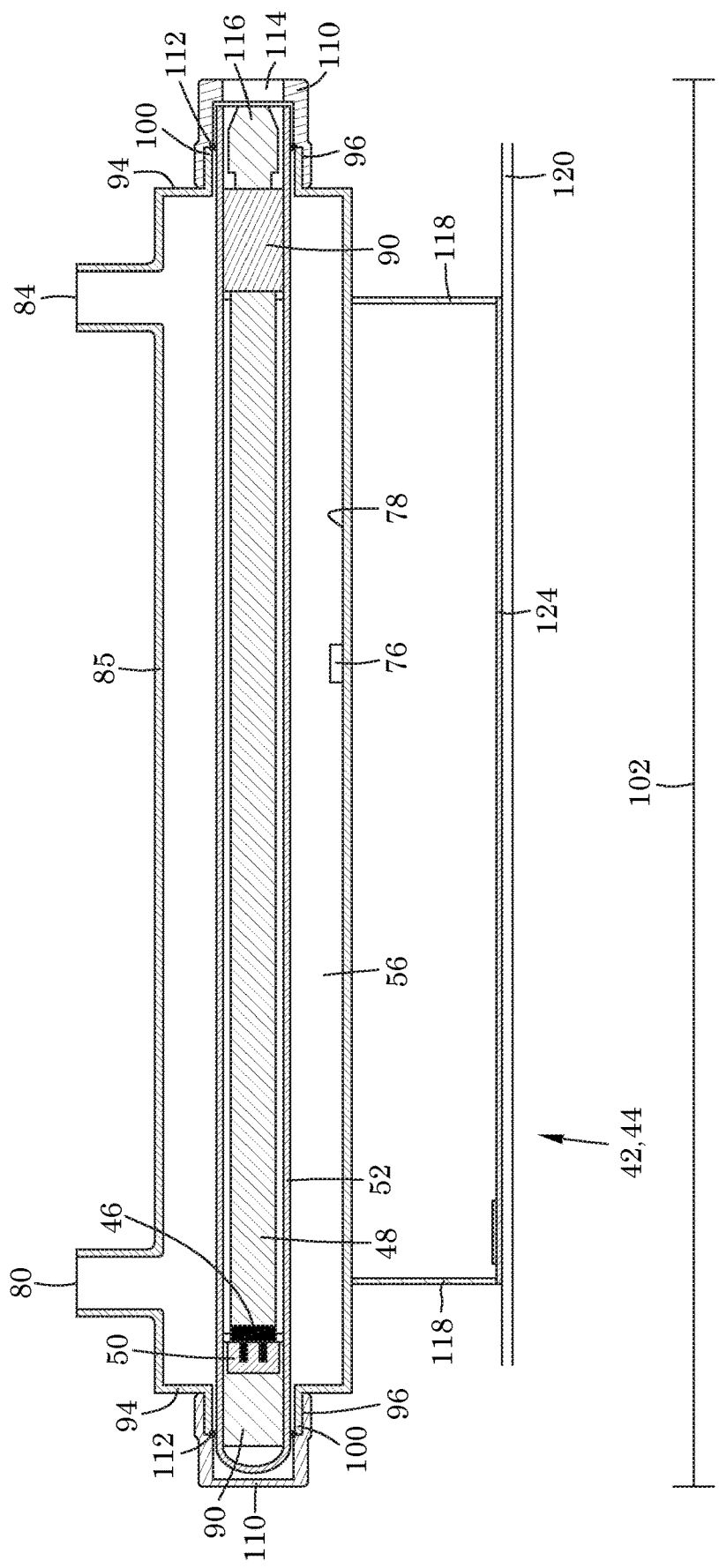
FIG. 2A is a longitudinal sectional view of an exemplary cylinder of the system of FIG. 1.

As shown in FIG. 2A, using one cylinder as an example, each cylinder 42, 44 houses a UV-C (100 nano meters (nm) to 280 nm, specifically 254 nm) light source 48 which is housed in a quartz tube 52. The quartz tubes 52 are housed in a bore 56 of the cylinders 42, 44. A UV sensor 76 is housed in the cylinder 42, 44. A base 46 at the end of the light source 48 is releasably mated with a socket 50, both of which are specific to the light source 48, examples of which are found in U.S. Pat. No. 7,604,505, incorporated herein in its entirety, which in turn is in electrical communication with the light ballast of FIG. 4. This ensures that only the light source 48 of the disinfection device 10 can be used in the disinfection device 10.

Figure 2B:
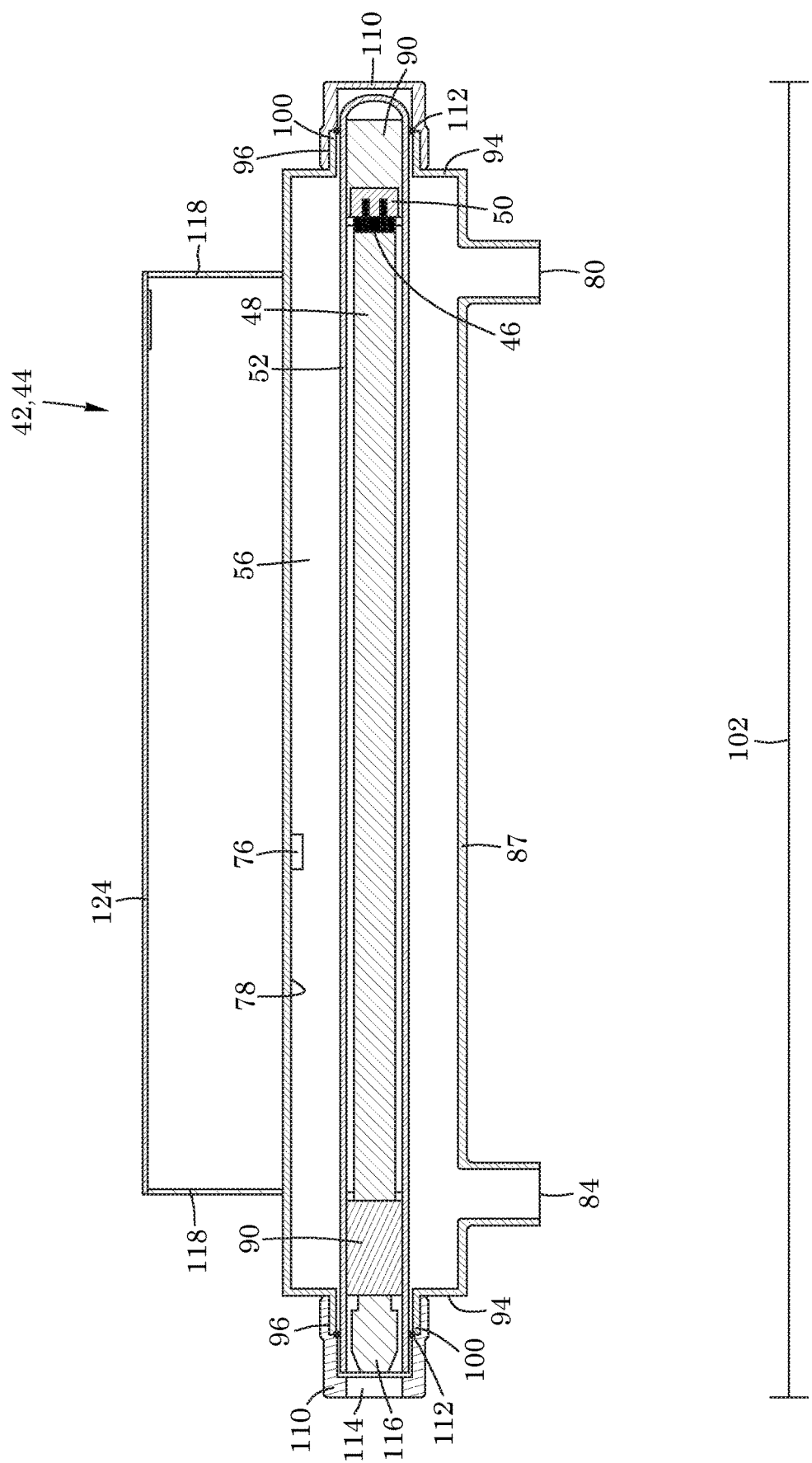
FIG. 2B is a longitudinal sectional view of an alternative embodiment of the cylinder of FIG. 1.

The cylinder has a mirrored, electropolished inner surface 78. Without being bound to theory, the mirrored, electropolished inner surface 78 allows for a lower light irradiance to result in a higher dosage, hence a 100 microwatt per square centimeter irradiance UV-C light source produces a dosage that would be produced by a 160 microwatt per square centimeter irradiance UV-C light source. The cylinder inlet 80 and the cylinder outlet 84 are located normal to the cylinder bores 56 and extend upward from the upper surface 85 of the cylinder 42. In another embodiment shown in FIG. 2B, the inlet 80 and the outlet 84 extend from the lower surface 87 of the cylinder. Testing showed that the embodiment of FIG. 2A provided much higher dosages (see Tables 4 and 5). Without being bound to theory, the improvement is expected to result from a higher volume of water in the cylinder 42 as less air is trapped. Consequently, the exposure time is higher.

The inlet 80 and outlet 84 are barbed connectors for connecting the device inlet and outlet lines 34, 38. The quartz tube 52 extends the length 102 of the cylinder 42. An end cap 90 releasably retains the quartz tube 52 in the cylinder 42 on a central longitudinal axis 92 of the bore 56. A shoulder 94 at each end of the bore 56 slidably retains the end cap 90. Threads 96 on an outer surface 98 of the cylinder 42 at the neck 100 threadedly retain a nut 110 or a threaded cap. An O-ring 112 is seated between the nut 110 and the outer surface 98. One nut 110 has an orifice 114 for the power connector 116 that connects to the UV light source 48. The cylinder 42 is retained with a pair of pipe claims 118 to allow it to sit inside the housing 66 so that it is raised from the inside lower surface 120 of the housing and is spaced apart from the inside upper surface. The pipe clamps 118 are attached to a strut 124 that extends across the width of the device 10.

Figure 3A:
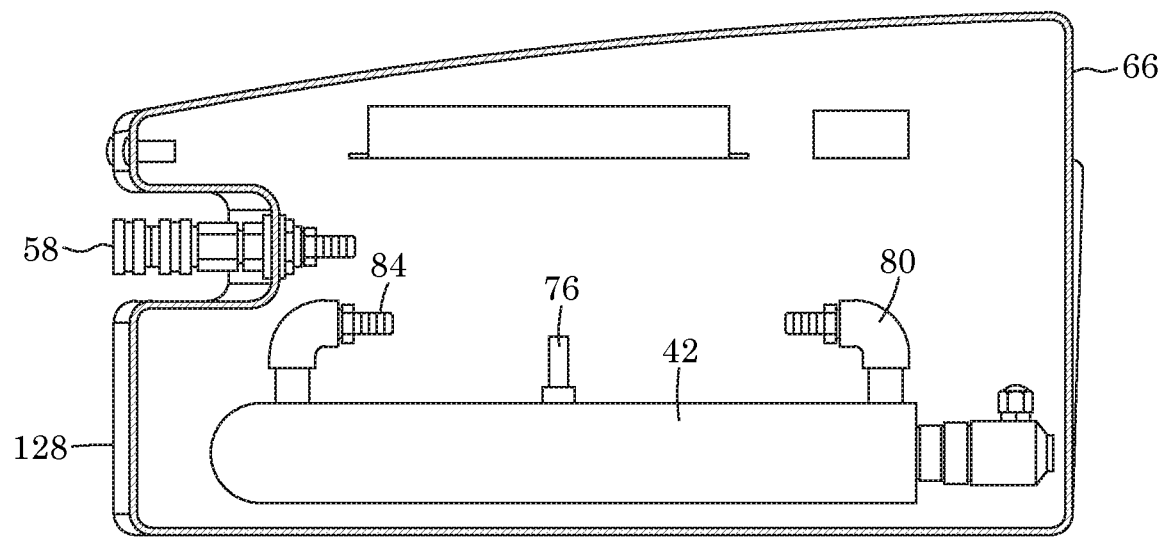
FIG. 3A is a side sectional view of the housing of the device.
Figure 3B:
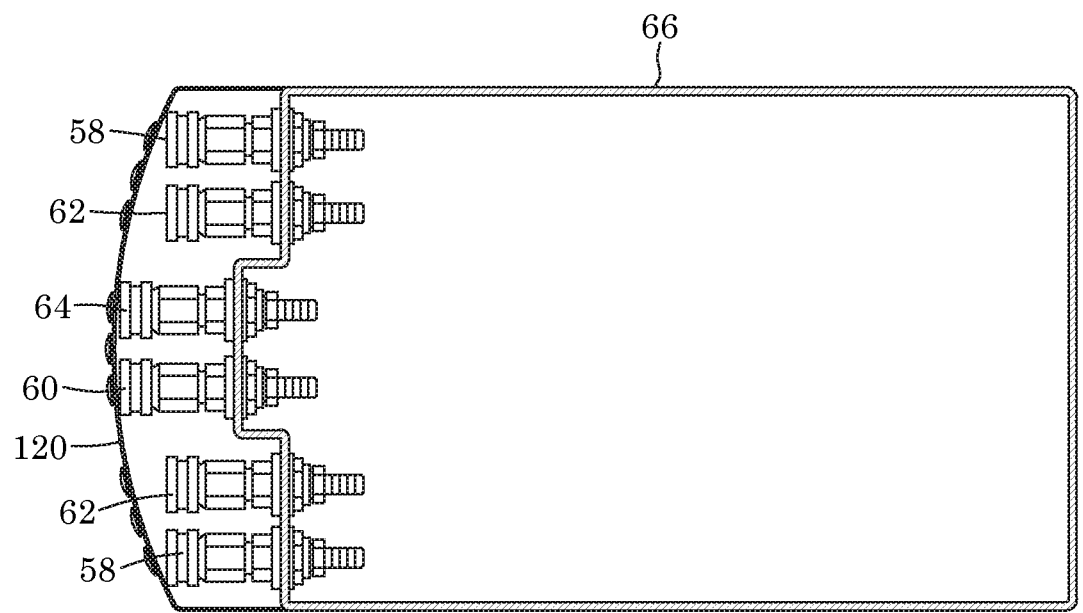
FIG. 3B is top sectional view of the housing of the device.

As shown in FIG. 3A, the housing 66 has a slot 126 in the front 128 in which the inlets 58 and outlets are retained, such that they are flush with the front 128 of the housing 66. The cylinder 42 is in the upright configuration, in which the inlet 80 and outlet 84 extend upward. The UV sensor 76 can be seen. FIG. 3B shows the middle inlet 60 and outlet 64 of a three cylinder system are offset from the outer inlets 58 and outlets 62. The front 128 is curved.

Figure 4:
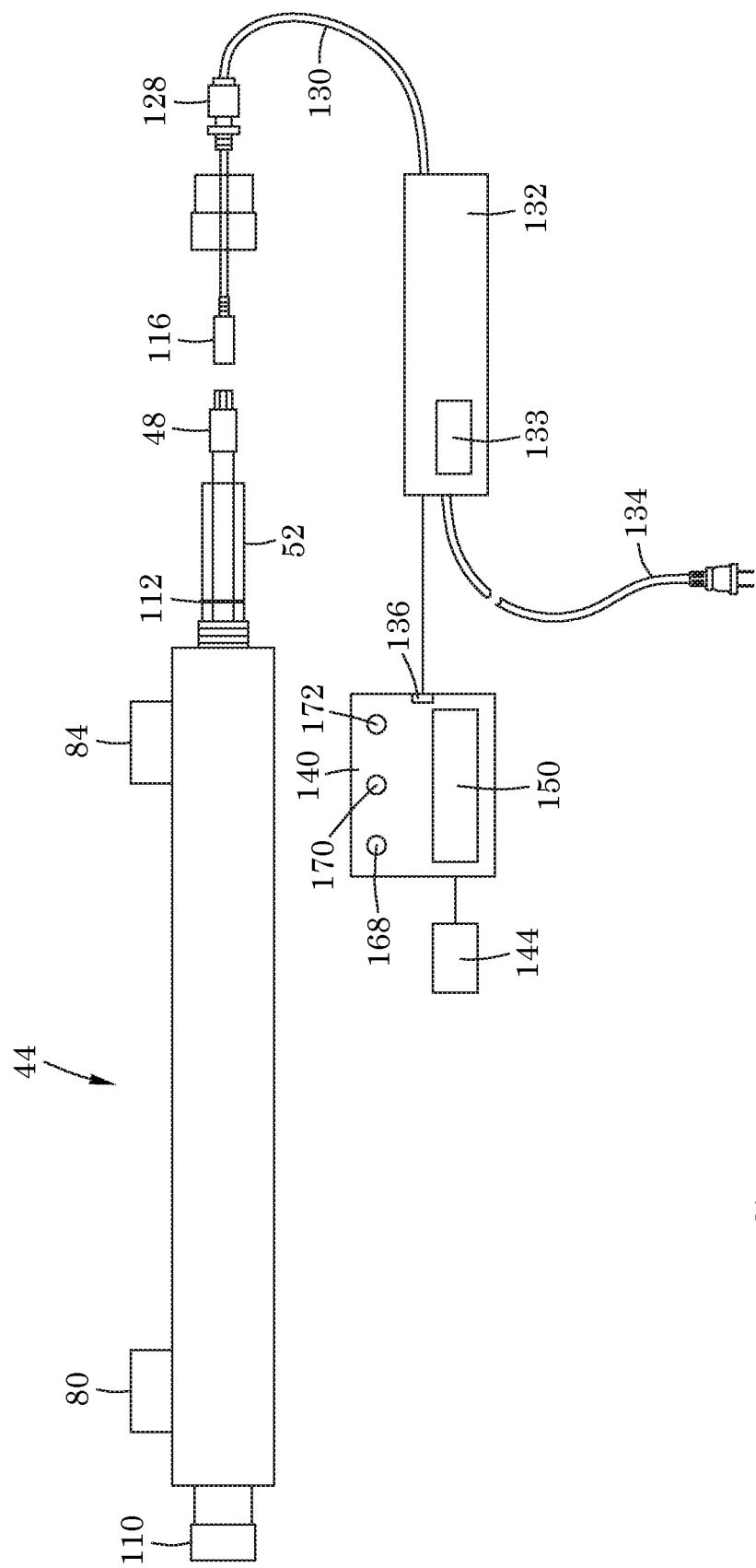
FIG. 4 is a schematic of the electrical system of a unit of the device of FIG. 1.

As shown in FIG. 4, a cable gland 118 connects the power connector 116 to a cable 130 that is in electrical communication with the light ballast 132. The light ballast 132 includes a green LED light 133. A power cord 134 extends from the light ballast 132. The light ballast 132 is in electrical communication with the flow switch 18 of FIG. 1. The flow switch 18 closes when there is flow in the circuit 12, 14, which signals a relay 136 in the ballast control centre 140 to send power to the light ballast 132. The flow switch 18, therefore prevents the light ballast 132 from energizing if there is no flow. The ballast control centre 140 is in electrical communication with the light ballast 132. The ballast control centre 140 is a printed circuit board and includes a real-time monitor that measures the hours of use of the light source 48. It is electrical communication with the UV sensors 78. The relay 136 will shut down the circuit 12, 14 if the light source 48 is not changed. The ballast control centre 140 is also in electrical communication with a data logger 144, which records light ballast 132 usage. This is in electrical communication with a read-out 150 showing light source days remaining. The ballast control centre 140 is also in electrical communication with the temperature switch 19 of FIG. 1 and the relay 136 will shut down the circuit 12, 14 if the temperature is outside of the acceptable range. The ballast control centre 140 is in electrical communication with an audible alarm and red light emitting diode (LED) light 168, a yellow LED 170 and a green LED 172. The conditions associated with the various LEDs being lit are described in Table 3. To be clear, each circuit includes these components.

Figure 5:
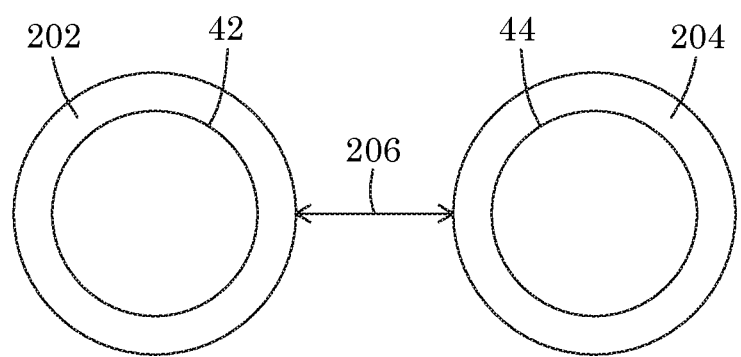
FIG. 5 is an end view of the cylinders.

As the HCU in a cardiac surgical unit provides a cold water supply for cooling the heart and an oxygenated water supply for oxygenating the heart, the temperature of the water in the two circuits needs to be maintained at their respective temperatures. For this reason, as shown in FIG. 5, the cylinders 42, 44 are placed about 4.73 inches apart, centre to centre. Each cylinder 42, 44 is wrapped along it length 102 with an insulation layer 202, 204 to an R value of at least about 3.0, preferably 3.2. The distance 206 between the insulation layers 202, 204 is between about 1 inch to about 1.5 inches, preferably about 1.23 inches. The lines within the device are wrapped with insulation to provide an R value of at least about 3.0, preferably 3.3. The insulation protects the fluid from the ambient environment temperature and reduces or eliminates sweating.

The system can treat fluid flowing through ½ inch hose diameter (ID) at up to 20 liters per minute. The pressure of the fluid is about 14.5 psi-29 psi. The preferred flow rate of the fluid is 20 liters per minute. The flow rate and pressure are maintained at the same level as in the lines. The system is a closed system. Once they are charged with the fluid, which in the preferred embodiment is water, the pressure and flow rate is consistent over time and location (position in the lines and device). The fluid in the system flows into the cylinder and along the length of the UV light source, which irradiates in a full 360 degrees. The light source is 330 mm long. The void volume of the cylinder is 951 mL. The distance between the quartz tube 52 and the inner wall of the cylinder 42 is 18.7 mm (0.735 inch). The light dosage is high and is about 130 millijoules per square centimeter per circuit based on the end of lamp life of 80%.

Figure 6A:
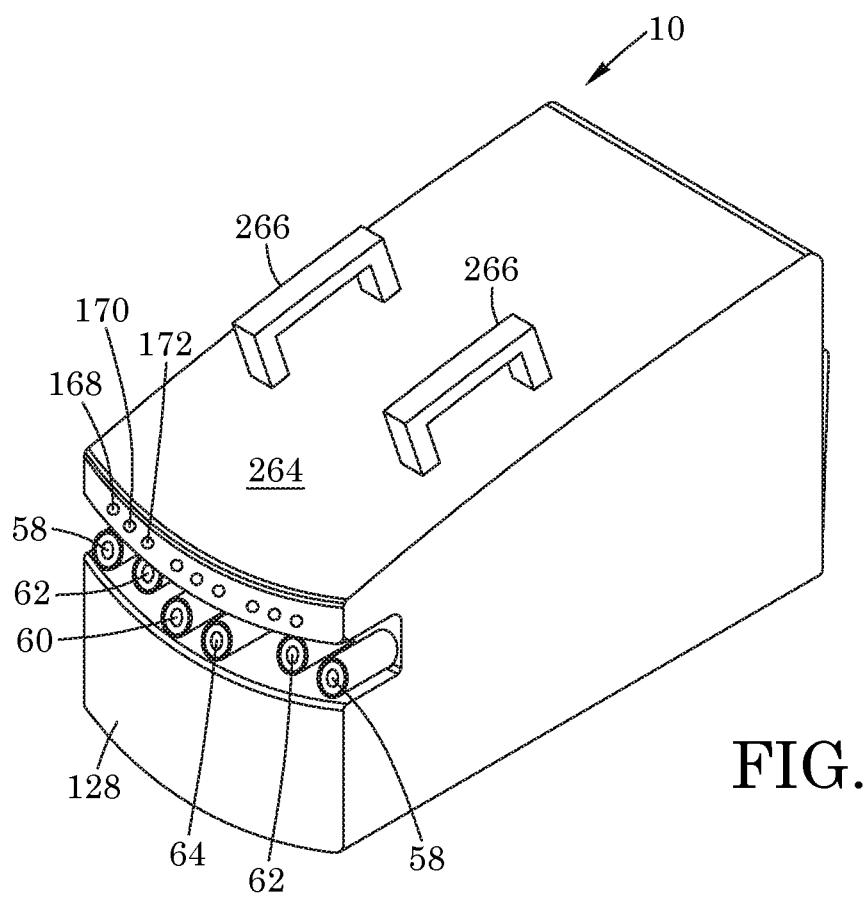
FIG. 6A is a perspective view of the housing of the device of FIG. 1.
Figure 6B:
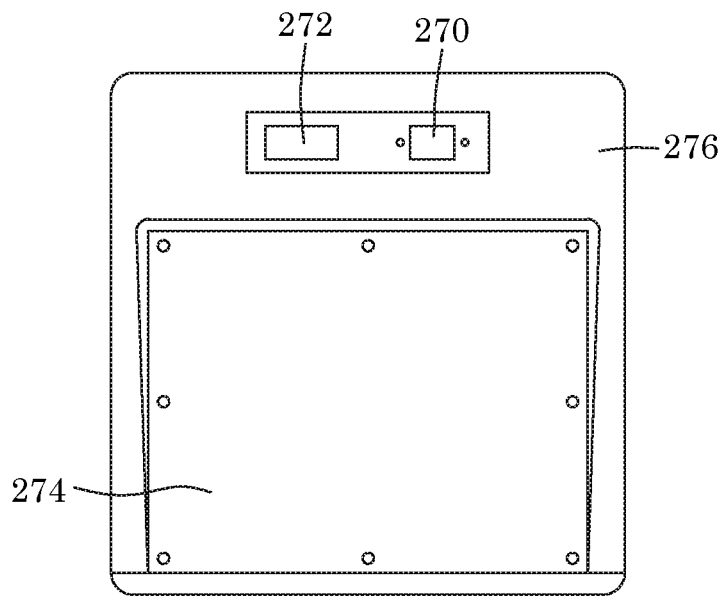
FIG. 6B is a back view of the housing of the device of FIG. 1.

As shown in FIG. 6A, the red, yellow and green LEDs 168, 170, 172 are located at the front 128 of the housing 66. Two handles 266 are located on the outer surface 264. As shown in FIG. 6B, a power on indicator light 270, a switch 272 and an access panel 274 are located on the back 276 of the device 10. The device weighs about 48 pounds, when constructed from stainless steel and can easily be carried by one person. In an alternative embodiment, the device is constructed from aluminum and weighs about 20 to about 30 pounds.

Figure 7:
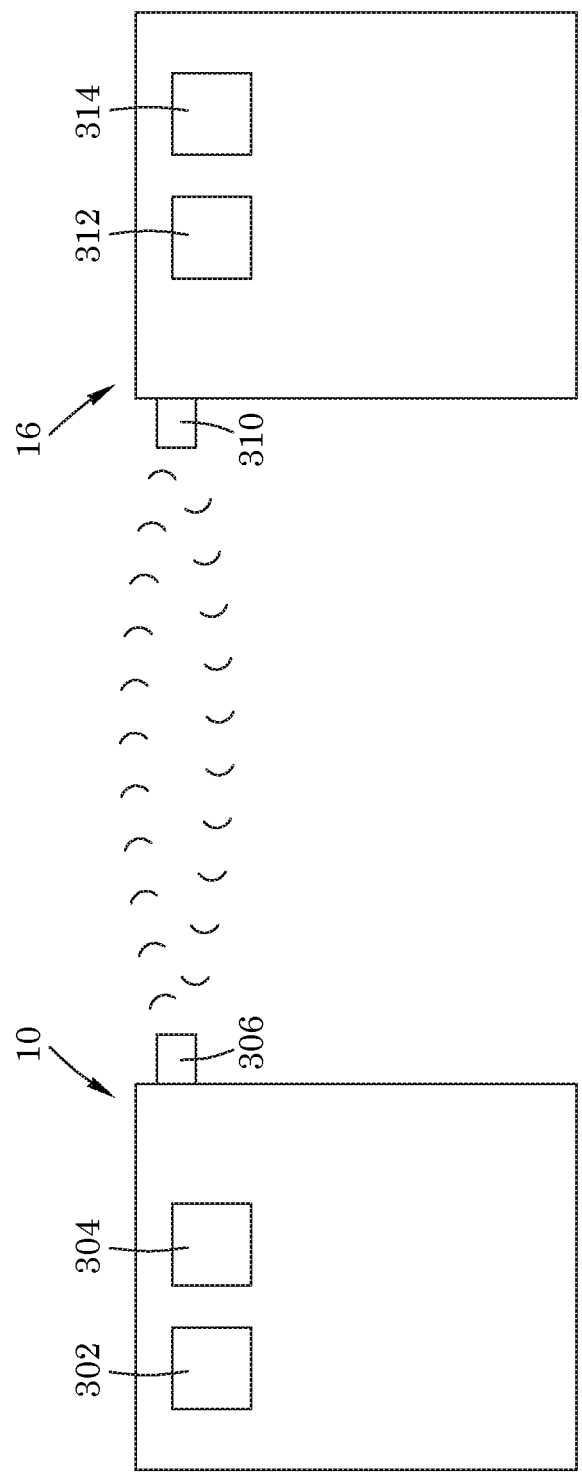
FIG. 7 is a schematic of an alternative embodiment of the system of FIG. 1.

In an alternative embodiment shown in FIG. 7, the system 8 includes a safeguard that prevents the system 8 from being used until the UV light source 48 has been running for at least 30 minutes, preferably 45 minutes and most preferably an hour. Both the device 10 and the HCU 16 are provided with a wireless antenna 306, 310, which may be Blue Tooth® or Wi-Fi or the like. The device 10 includes firmware 302 and a processor 304 under control of the firmware 302. Once the UV light source 48 has run for the prescribed amount of time, the firmware instructs the processor 304 to send a signal to the HCU indicating that it can be started. The firmware 312 and processor 314 in the HCU control start up. The signal is preferably sent wirelessly, however, a wired connection could also be used.

In some embodiments, the device may house a pump for each circuit.

In another embodiment, the device may recirculate the fluid within the device, hence there is one line in fluid communication with the inlet and the outlet and in fluid communication with the pump. A bleed line with a releasable closure is in fluid communication with the line.

In another embodiment, there are three circuits, with three vessels, each vessel having a lamp, as described above for the two cylinder and two lamp embodiment. The flow rate remains the same (20 liters per minute). The lamp has an intensity of about 240 milliwatts per centimeter squared based on the end of lamp life of 80%. The light dosage is high (see Table 4) and is about 240 millijoules per square centimeter per circuit based on the end of lamp life of 80%.

In another embodiment, there is one circuit, with one vessel having a lamp, as described above for the two cylinder and two lamp embodiment. The flow rate remains the same. The lamp has an intensity of about 120 milliwatts per centimeter squared based on the end of lamp life of 80%. The light dosage is high (see Table 4 and is about 240 millijoules per square centimeter per circuit based on the end of lamp life of 80%.

In yet another embodiment, there is one water circuit and two vessels, each with a lamp. The relationship between the vessels and the lamps is as described above. Each lamp has an intensity of about 80 milliwatts per square centimeter based on the end of lamp life of 80%. The light dosage is high (see Table 5) and is about 800 millijoules per square centimeter per circuit based on the end of lamp life of 80% and a flow rate of about 5.5 liters per minute. This device is for extracorporeal membrane oxygenation.

A method of reducing, eliminating or controlling both *Mycobacterium chimaera* and the associated biofilm (note that the method and device do not remove existing biofilm, but will reduce, eliminate or control formation of new biofilm) is as follows: The disinfection device is attached with the inlet and outlet lines to an HCU. The UV lamp is powered, allowing for sufficient warm up time. Once it is sufficiently warmed up, the HCU and pumps, whether internal to the HCU or external are started and the cylinders and lines in the disinfection device are charged with reverse osmosis water. The flow rate is between about 9 Litres/minute (L/min) to about 20 L/min, for example, 9-11 L/minute for the patient circuit and 15-17 L/min for the cardioplegia circuit in HCUs. The exposure time of the fluid to the UV light is very low. At 20 L/min the water is exposed for about 2.86 seconds. At about 15 L/min, the water is exposed for about 3.77 seconds.

At a total system volume of about 15 litres, the water in the system completes one circuit at 9-11 L/min in approximately 1.5 minutes and at 15 L/min, in about 1 minute.

In a larger system with a total volume of about 29 litres, the water in the system completes one circuit at 9-11 L/min in about 3 minutes and at 15-17 L/m, in about 2 minutes. Thus, the water is recirculated quickly through the system, exposing the water to the UV light source every 1-3 minutes, but for only a few seconds (about 3 seconds per circuit). The effect of recirculation on the bacterial count can be seen in the examples. Recirculating the water in a closed system results in about a $Log_{10}$ 9 reduction in bacteria.

Example 1

The efficacy of the antimicrobial (disinfectant) device was tested using the American Society for Testing and Materials (ASTM) International Method E2315 Modified for Devices—Assessment of Antimicrobial Activity using a Time-Kill Procedure. ASTM E2315 is a quantitative test method designed to assess changes in the population of microorganisms in an antimicrobial liquid suspension. The method is versatile and can be conducted using contact times ranging from ten seconds to 24 hours. The ASTM E2315 test method uses non-antimicrobial agents as controls to establish baselines for microbial reductions.

The device tested was an early design in which the inner surface of the cylinder was mirrored but was not electropolished. The orientation of the inlet and the outlet was down, such that air was trapped in the cylinder.

The test microorganism used was *Mycobacterium smegmatis* which is an acid-fast, *bacillus*-shaped aerobic microorganism that is found in soil, plants, and water. *Mycobacterium smegmatis* is commonly used as a surrogate model for *Mycobacterium tuberculosis* because the two microorganisms share a number of morphological traits including the distinctive waxy cell that provides robust resistance to chemical disinfectants and sanitizers. Similarly, it shares a number of morphological traits with *Mycobacterium chimaera*.

Summary of the Procedure

Test microorganisms were prepared in liquid culture medium for bacteria or on agar for fungi.

The suspension of test microorganism was standardized, as needed, by dilution in a buffered saline solution.

Test and control substances were dispensed in identical volumes to sterile vessels.

Independently, Test and Control substances were inoculated with each test microorganism, then mixed and incubated.

Control substances were immediately harvested and represent the concentration present at the start of the test, or time zero.

At the conclusion of the contact time, a volume of the liquid test solution was harvested and chemically neutralized.

Dilutions of the neutralized test solution were assayed using appropriate growth media to determine the surviving microorganisms at the respective contact times.

Reductions of microorganisms were calculated by comparing initial microbial concentrations to final microbial concentrations.

Criteria for Scientific Defensibility of an ASTM E2315 Study

For a Time Kill study to be scientifically defensible, the following criteria must be met:

1. The average number of viable bacteria recovered from the time zero samples must be approximately $1\times10^6$ cells/ml or greater.

2. Ordinary consistency between replicates must be observed for the time zero samples.

3. Positive/Growth controls must demonstrate growth of appropriate test microorganism.

4. Negative/Purity controls must demonstrate no growth of test microorganism.

Testing Parameters used in this Study

Culture Growth Media: BHI Agar
Culture Growth Time: 5-10 days
Culture Dilution Media: N/A
Inoculum Volume: 10.0 ml
Inoculum Concentration: ~$1.0\times10^6$ CFU/ml
Contact Temp.: Ambient
Contact Time: 2, 5, and 10 minutes
Volume Harvested: ~100.0 ml
Neutralizer (Vol.): N/A
Enumeration Plate Incubation Temperature: 36°±1° C.
Enumeration Plate Incubation Time: 3-5 days
Test Substance Volume: 10 liters Replicates: Double (2)
Control Substance Volume: 10 liters
Control Substance: Sterile R/O Water Disinfection Device Preparation The disinfection device was rinsed thoroughly with a dilute disinfecting solution, neutralized with sodium thiosulfate and lecithin solution, and then rinsed with sterile reverse osmosis water multiple times.

During preparation, the hose for collection was allowed to re-circulate into the water holding tank. To drain tank, water was allowed to pass through the collection tube into a separate collection tank.

Study Procedure for Re-circulation Testing

The disinfection device was off and the inoculum was prepared in the input tank. During inoculum preparation, the small circulation pump was allowed to run.

~8 L of sterile reverse osmosis water was added and this volume was spiked with sufficient amount of microorganism to achieve ~$1.0\times10^6$ CFU/ml. The small recirculation pump was allowed to run with the UV light source on for >10 minutes. During this time, the large pumps were off and water did not circulate through the cylinders.

The pumps were plugged in and the water was allowed to run through the disinfection device into the input tank for the contact time.

Once the pumps were activated, a timer was initiated and the disinfection device was allowed to run for the initial contact time of 2 minutes.

After the contact time elapses, a sample was collected by closing the hose manually and opening it to collect into a sterile vessel.

Once collected, the disinfection device was allowed to circulate through the collection and recirculation paths, for the remaining contact times. Samples were taken after each contact time.

The disinfection device was turned off once the sample was collected.

TABLE 1

Results

| Test microorganism | Sampling type | Contact time | CFU/mL | Percent reduction compared to time zero | $Log_{10}$ reduction compared to time zero |
|---|---|---|---|---|---|
| M. smegmatis | Recirculation | time zero | 1.00E+06 | N/A | N/A |
| M. smegmatis | Recirculation | 2 minutes | 8.00E+03 | 99.20% | 2.10 |

TABLE 1-continued

Results

| Test microorganism | Sampling type | Contact time | CFU/mL | Percent reduction compared to time zero | $Log_{10}$ reduction compared to time zero |
|---|---|---|---|---|---|
| M. smegmatis | Recirculation | 5 minutes | 5.50E+03 | 99.45% | 2.26 |
| M. smegmatis | Recirculation | 10 minutes | 7.70E+02 | 99.92% | 3.11 |

Sampling Type Contact time CFU/ml
Test

Example 2

The efficacy of the antimicrobial (disinfectant) device will be tested using the American Society for Testing and Materials (ASTM) International Method E2315 Modified for Devices—Assessment of Antimicrobial Activity using a Time-Kill Procedure. ASTM E2315 is a quantitative test method designed to assess changes in the population of microorganisms in an antimicrobial liquid suspension. The method is versatile and can be conducted using contact times ranging from ten seconds to 24 hours. The ASTM E2315 test method uses non-antimicrobial agents as controls to establish baselines for microbial reductions.

The device includes the cylinder that is electropolished. The inlet and the outlet extend upwards from the cylinder and are located on the upper surface of the cylinder.

The test microorganism used will be *Mycobacterium smegmatis* which is an acid-fast, *bacillus*-shaped aerobic microorganism that is found in soil, plants, and water. *Mycobacterium smegmatis* is commonly used as a surrogate model for *Mycobacterium tuberculosis* because the two microorganisms share a number of morphological traits including the distinctive waxy cell that provides robust resistance to chemical disinfectants and sanitizers. Similarly, it shares a number of morphological traits with *Mycobacterium chimaera*.

Summary of the Procedure

Test microorganisms will be prepared in liquid culture medium for bacteria or on agar for fungi.

The suspension of test microorganism will be standardized, as needed, by dilution in a buffered saline solution.

Test and control substances will be dispensed in identical volumes to sterile vessels.

Independently, Test and Control substances will be inoculated with each test microorganism, then mixed and incubated.

Control substances will be immediately harvested and represent the concentration present at the start of the test, or time zero.

At the conclusion of the contact time, a volume of the liquid test solution will be harvested and chemically neutralized.

Dilutions of the neutralized test solution will be assayed using appropriate growth media to determine the surviving microorganisms at the respective contact times.

Reductions of microorganisms will be calculated by comparing initial microbial concentrations to final microbial concentrations.

Criteria for Scientific Defensibility of an ASTM E2315 Study

For a Time Kill study to be scientifically defensible, the following criteria must be met:

1. The average number of viable bacteria recovered from the time zero samples must be approximately $1 \times 10^6$ cells/ml or greater.
2. Ordinary consistency between replicates must be observed for the time zero samples.
3. Positive/Growth controls must demonstrate growth of appropriate test microorganism.
4. Negative/Purity controls must demonstrate no growth of test microorganism.

Testing Parameters Used in this Study

Culture Growth Media: BHI Agar
Culture Growth Time: 5-10 days
Culture Dilution Media: N/A
Inoculum Volume: 10.0 ml
Inoculum Concentration: ~$1.0 \times 106$ CFU/ml
Contact Temp.: Ambient
Contact Time: 30, 60, and 120 minutes
Volume Harvested: ~100.0 ml
Neutralizer (Vol.): N/A
Enumeration Plate Incubation Temperature: 36°±1° C.
Enumeration Plate Incubation Time: 3-5 days
Test Substance Volume: 10 liters Replicates: Double (2)
Control Substance Volume: 10 liters
Control Substance: Sterile R/O Water Disinfection Device Preparation The disinfection device will be rinsed thoroughly with a dilute disinfecting solution, neutralized with sodium thiosulfate and lecithin solution, and then rinsed with sterile reverse osmosis water multiple times.

During preparation, the hose for collection will be allowed to re-circulate into the water holding tank. To drain tank, water will be allowed to pass through the collection tube into a separate collection tank.

Study Procedure for Re-circulation Testing

The disinfection device will be off and the inoculum will be prepared in the input tank. During inoculum preparation, the small circulation pump will be allowed to run.

~8 L of sterile reverse osmosis water will be added and this volume will be spiked with sufficient amount of microorganism to achieve ~$1.0 \times 10^6$ CFU/ml. The small recirculation pump will be allowed to run with the UV light source on for at least 30 minutes. During this time, the large pumps will be off and water will not circulate through the cylinders.

The pumps will be plugged in and the water will be allowed to run through the disinfection device into the input tank for the contact time.

Once the pumps are activated, a timer will be initiated and the disinfection device will be allowed to run for the initial contact time of 2 minutes.

After the contact time elapses, a sample will be collected by closing the hose manually and opening it to collect into a sterile vessel.

Once collected, the disinfection device will be allowed to circulate through the collection and recirculation paths, for the remaining contact times. Samples will be taken after each contact time.

The disinfection device will be turned off once the sample will be collected.

TABLE 2

Results

| Test microorganism | Sampling type | Contact time | CFU/mL | Percent reduction compared to time zero | $Log_{10}$ reduction compared to time zero |
|---|---|---|---|---|---|
| M. smegmatis | Recirculation | time zero | 1.00E+06 | N/A | N/A |
| M. smegmatis | Recirculation | 30 minutes | 1 | 99.9999% | 6.00 |
| M. smegmatis | Recirculation | 60 minutes | 0.1 | 99.99999% | 7.00 |
| M. smegmatis | Recirculation | 120 minutes | 0.001 | 99.9999999% | 9.00 |

Sampling Type

TABLE 3

Safety system:

| GREEN LED | YELLOW LED | RED LED | SAFETY ATTRIBUTE | CONDITION | ACTION |
|---|---|---|---|---|---|
| OFF | OFF | OFF | The system is NOT ready to operate. | Either there is no Power to the device or the resettable breaker is in the off position. | Check incoming power connections and verify that the resettable breaker is in the ON position. |
| OFF | OFF | ON | To confirm that the device is properly connected to the water circuits of the host HCU and to confirm that water is flowing through the system. | The device has power and is ready to operate but water is not flowing thru the circuit. | Start flowing water thru the circuit. |
| ON | OFF | OFF | To confirm that the system is operating properly. | The device has power, water is flowing and all systems of the circuit are operating as designed | Monitor the lights for any changes. |
| OFF | FLASHING | ON | The system is programmed to alert the user that the UV lamp will need to be changed within 30 days from the date of yellow LED flashing alert. | The device has power and is ready to operate but water is not flowing thru the circuit. The lamp will need to be changed within 30 days from when the yellow light first started to flash. | Start flowing water thru the circuit. Change the lamp within 30 days from the time the yellow light first started to flash. |

TABLE 3-continued

Safety system:

| GREEN LED | YELLOW LED | RED LED | SAFETY ATTRIBUTE | CONDITION | ACTION |
|---|---|---|---|---|---|
| ON | FLASHING | OFF | The system is programmed to alert the user that the UV lamp will need to be changed within 30 days from the date of yellow LED flashing alert. | The device has power. Water is flowing thru the circuit and the circuit is operating as designed. But the user has must change the lamp within 30 days from the time the yellow light first comes on. | Change the lamp within 30 days from the time the yellow light first started to flash. |
| OFF | FLASHING | FLASHING | The system will prevent the user from operating the lamp beyond the recommended operating life. | The water circuit is not operating and the lamp needs to be changed immediately. The water circuit will not operate until the lamp is changed and the lamp life timer is reset. | Change the lamp and reset the lamp life timer. |
| FLASHING | FLASHING | FLASHING | The system will prevent the user from operating the specific circuit when there is a problem other than a required lamp change. | The device has power; water may or may not be flowing. The circuit is not operating for a reason other than a scheduled lamp change. | Notify the manufacturer. |

TABLE 4

| Flow rate (liters/minute) | Dosage in mJ/cm$^2$ | |
|---|---|---|
| | Inlet & outlet down | Inlet & outlet up |
| 20 | 132.84 | 265.68 |
| 19 | 139.83 | 279.66 |
| 18 | 147.60 | 295.20 |
| 17 | 156.28 | 312.56 |
| 16 | 166.05 | 332.10 |
| 15 | 177.12 | 354.24 |
| 14 | 189.77 | 379.54 |
| 13 | 204.37 | 408.74 |
| 12 | 221.40 | 442.80 |
| 11 | 241.53 | 483.06 |
| 10 | 265.68 | 531.36 |
| 9 | 295.20 | 590.40 |
| 8 | 332.10 | 664.20 |
| 7 | 379.54 | 759.08 |
| 6 | 442.80 | 885.60 |
| 5 | 531.36 | 1,062.72 |
| 4 | 664.20 | 1,328.40 |
| 3 | 855.60 | 1,711.20 |
| 2 | 1,328.40 | 2,656.80 |
| 1 | 2,656.80 | 5,313.60 |

TABLE 5

| Flow rate (liters/minute) | Dosage in mJ/cm$^2$ | |
|---|---|---|
| | Inlet & outlet down | Inlet & outlet up |
| 20 | 120.12 | 240.24 |
| 19 | 126.44 | 252.88 |
| 18 | 133.46 | 266.92 |
| 17 | 141.31 | 282.62 |
| 16 | 150.15 | 300.30 |
| 15 | 160.16 | 320.32 |
| 14 | 171.60 | 343.20 |
| 13 | 184.80 | 369.60 |
| 12 | 200.20 | 400.40 |
| 11 | 218.40 | 436.80 |
| 10 | 240.24 | 480.48 |
| 9 | 266.93 | 533.86 |
| 8 | 300.29 | 600.58 |
| 7 | 343.19 | 686.38 |
| 6 | 400.39 | 800.78 |
| 5 | 480.47 | 960.94 |
| 4 | 600.59 | 1,201.18 |
| 3 | 800.78 | 1,601.56 |
| 2 | 1,201.18 | 2402.36 |
| 1 | 2,402.36 | 4804.70 |

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize, or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A portable, liquid disinfection device for integration into a closed recirculation system, for use in heart surgery, which includes a heater-cooler unit (HCU), a cooling circuit in fluid communication with the HCU and an oxygenating circuit in fluid communication with the HCU, the portable, liquid disinfection device comprising: a housing which includes an inside upper surface and an inside lower surface, which is opposite the inside upper surface; a first external connector pair comprising a first external inlet line connector and a first external line outlet connector, which are for fluid connection with the cooling circuit; at least a second external connector pair comprising a second external inlet line connector and a second external line outlet connector, which are for fluid connection with the oxygenating circuit; and at least two units which are housed within the housing and are spaced apart from the inside lower surface, the inside upper surface and from one another, each unit including:
   at least one stainless steel cylinder, the cylinder defining a bore, the bore terminating in a first end and a second end, the cylinder including a mirrored, electropolished inner surface, an inlet in a vicinity of the first end and an outlet in a vicinity of the second end, both the inlet and the outlet disposed on an upper surface of the stainless steel cylinder and in fluid communication with the bore;
   a quartz tube centrally located in the bore and extending between the first end and the second end, the bore and quartz tube defining a void volume which accommodates a flow rate of at least 15 liters of liquid per minute;
   a high irradiance Ultraviolet-C (UV-C) light source housed in the quartz tube and extending a length of the quartz tube, the light source including a power connector, the light source optically unobstructed from the mirrored, electropolished inner surface along the length of the quartz tube;
   an inlet line and an outlet line, the lines in fluid communication with the inlet and outlet, respectively and with one of the external connector pairs;
   a first end cap and a second end cap, the end caps releasably sealing the first end and the second end, one of the first end cap and the second end cap including an orifice for the power connector to extend therefrom;
   a ballast for the UV-C light source, the ballast in electrical communication with the power connector; and
   a ballast control panel in electrical communication with the ballast.

2. The device of claim 1, wherein the high irradiance UV-C light source is an at least about 150 milliwatt per square centimeter UV-C light source.

3. The device of claim 2, wherein the at least about 150 milliwatt per square centimeter UV-C light source is an at least about 240 milliwatts per square centimeter UV-C light source.

4. The device of claim 3, wherein, in use, the void volume in each unit receives about 240 millijoules per square centimeter UV-C light.

5. The device of claim 4, wherein each cylinder is insulated to an R value of at least about 3.0.

6. The device of claim 5 further comprising at least one handle attached to and extending from an outside upper surface of the housing.

7. The device of claim 6, wherein the void volume is about 951 milliliters and the distance between the quartz tube and the inner wall of the cylinder is about 18.7 mm.

8. A controlled pressure, closed water recirculation system, the system including a heater-cooler unit (HCU) for heart surgery, a portable disinfection device, a cooling water circuit, and an oxygenating water circuit, each circuit including the HCU and the portable disinfection device, the disinfection device including a housing which includes an inside upper surface and an inside lower surface which is opposite the inside upper surface and at least two units which are housed within the housing and are spaced apart from the inside lower surface, the inside upper surface and from one another, each unit in separate fluid communication with the HCU to provide each of the cooling water circuit and the oxygenating water circuit, wherein each unit comprises:
   at least one stainless steel cylinder, the cylinder defining a bore, the bore terminating in a first end and a second end, the cylinder including a mirrored, electropolished inner surface, an inlet in a vicinity of the first end and an outlet in a vicinity of the second end, both the inlet and the outlet disposed on an upper surface of the stainless steel cylinder and in fluid communication with the bore;
   a quartz tube centrally located in the bore and extending between the first end and the second end, the bore and quartz tube defining a void volume which accommodates a flow rate of at least 15 liters of liquid per minute;
   a high irradiance Ultraviolet-C(UV-C) light source housed in the quartz tube and extending a length of the quartz tube, the light source including a power connector, the light source optically unobstructed from the mirrored, electropolished inner surface along the length of the quartz tube;
   an inlet line and an outlet line, the lines in fluid communication with the inlet and outlet, respectively;
   a first end cap and a second end cap, the end caps releasably sealing the first end and the second end, one of the first end cap and the second end cap including an orifice for the power connector to extend therefrom;
   a ballast for the UV-C light source, the ballast in electrical communication with the power connector;
   and a ballast control panel which is in electrical communication with the ballast.

9. The system of claim 8, wherein the high irradiance UV-C light source is an at least about 150 milliwatt per square centimeter UV-C light source.

10. The system of claim 9, wherein the at least about 150 milliwatt per square centimeter UV-C light source is an at least about 240 milliwatts per square centimeter UV-C light source.

11. The system of claim 10, wherein, in use, the void volume in each unit receives about 240 millijoules per square centimeter UV-C light.

12. The system of claim 11 wherein each unit is insulated.

13. The system of claim 12, wherein each cylinder is insulated to an R value of at least about 3.0.

14. The system of claim 13 further comprising at least one handle attached to and extending from an outside upper surface of the housing.

15. A method of reducing or eliminating microbial contamination in a high flow rate, controlled pressure, closed liquid recirculation system, the method comprising selecting the system of claim 8, turning the UV-C light source on, charging the system with liquid, irradiating the liquid with the high irradiance UV-C light source and recirculating the liquid through the system, thereby reducing or eliminating microbial contamination.

16. The method of claim 15, wherein irradiating provides a dosage of at least about 200 millijoules per square centimeter.

17. The method of claim 16, wherein the microbial contamination includes microbial cells and biofilm.

18. The method of claim 17, wherein the microbial contamination includes *Mycobacterium* chimaera.

19. A method of reducing or eliminating microbial contamination a high flow rate, controlled pressure, closed liquid recirculation system, which includes an HCU, the method comprising integrating the device of claim 1 into the recirculation system, turning the UV-C light source on, charging the system with liquid, irradiating the liquid with the high irradiance UV-C light source and recirculating the liquid through the system, thereby reducing or eliminating microbial contamination.

20. The method of claim 19, wherein irradiating provides a dosage of at least about 200 millijoules per square centimeter.

21. The method of claim 20, wherein the microbial contamination includes *Mycobacterium* chimaera.

\* \* \* \* \*